April 14, 1925.   
R. T. HAZELTON  
1,533,548

GEAR CASING FOR SHAPERS

Filed July 21, 1922    6 Sheets-Sheet 2

Inventor
Robert T. Hazelton
By Wood & Wood
Attorneys

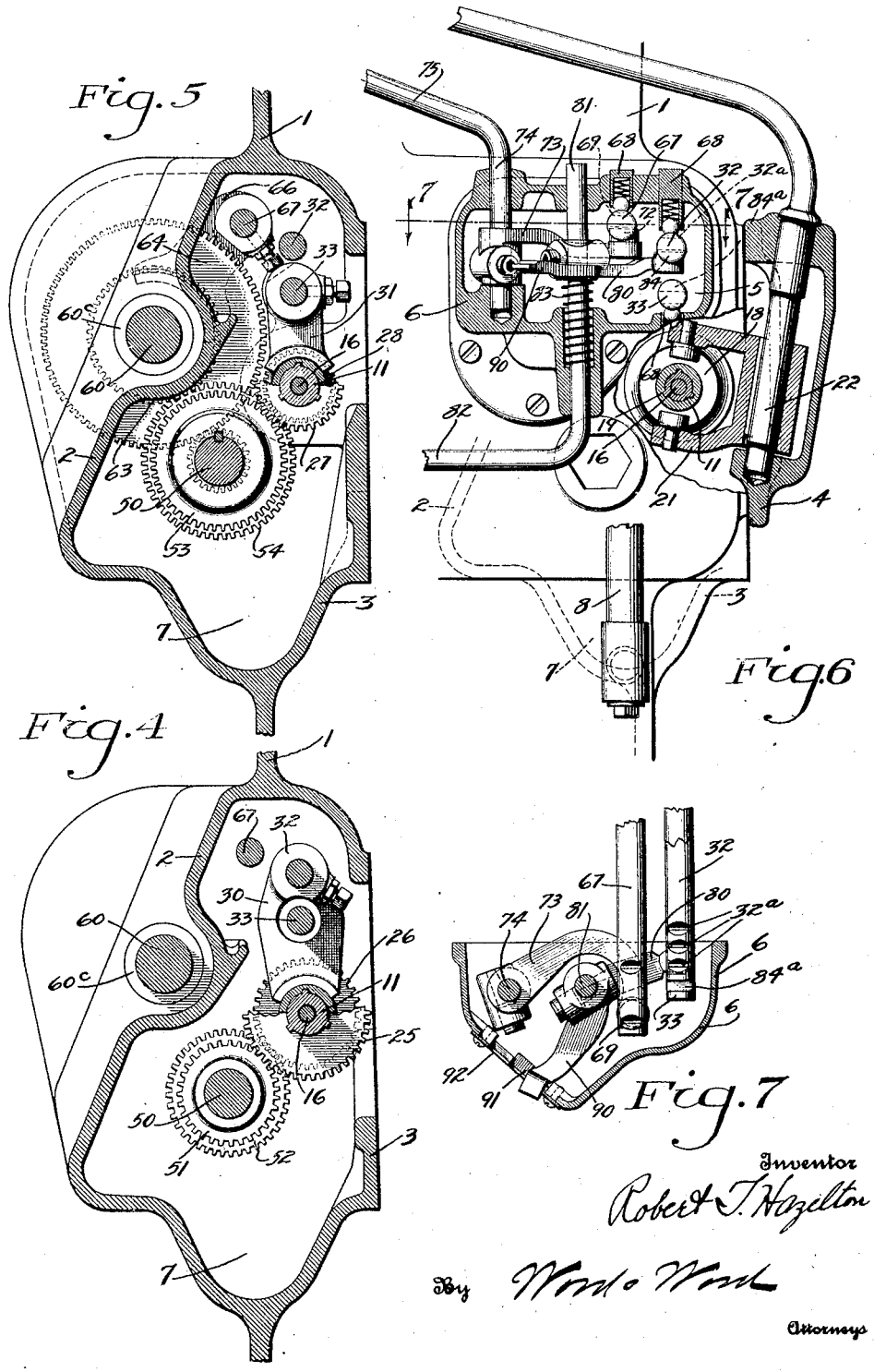

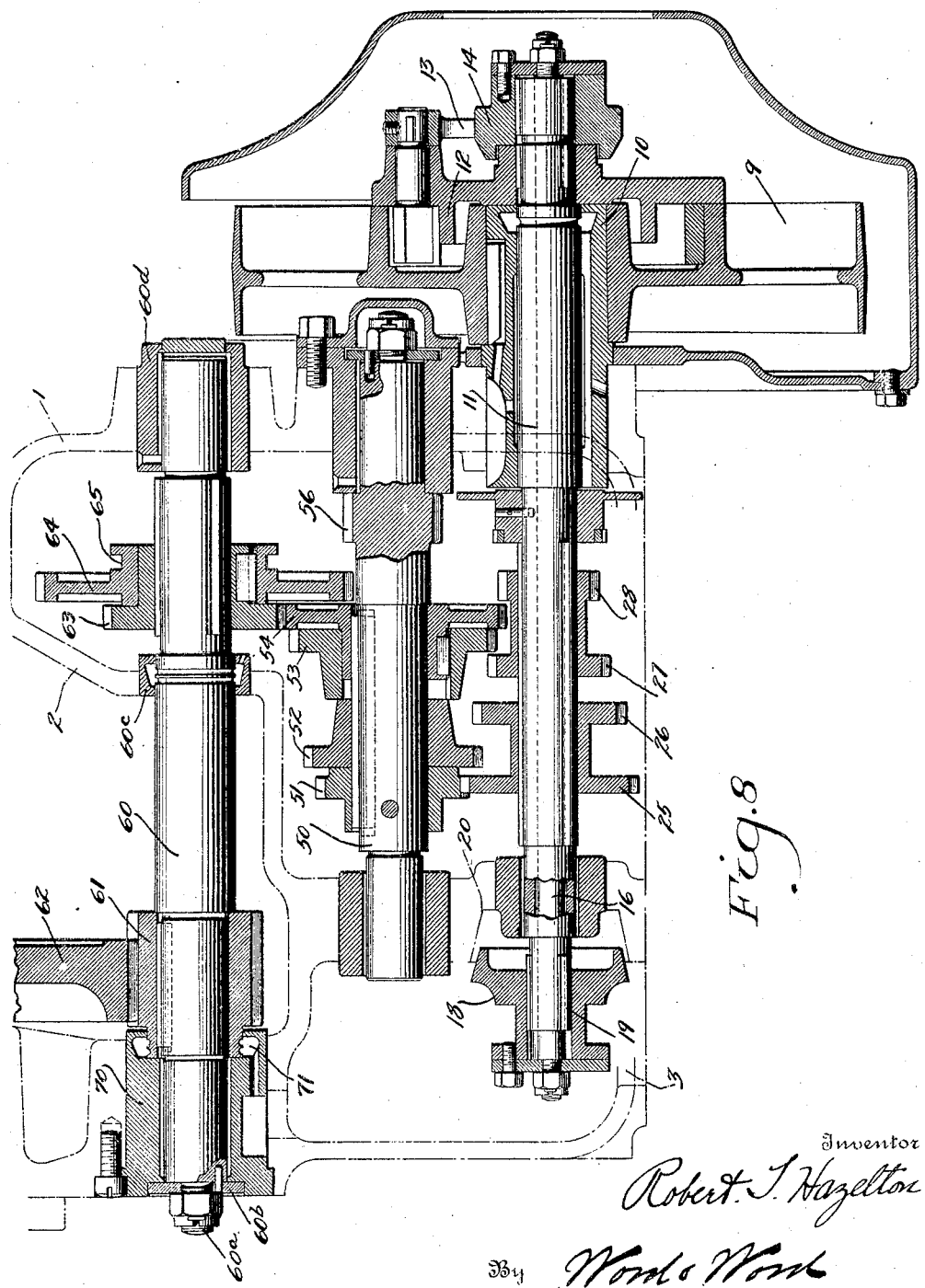

April 14, 1925.

R. T. HAZELTON 1,533,548

GEAR CASING FOR SHAPERS

Filed July 21, 1922

Inventor
Robert T. Hazelton.

By Wood & Wood
Attorneys

Patented Apr. 14, 1925.

1,533,548

UNITED STATES PATENT OFFICE.

ROBERT T. HAZELTON, OF CINCINNATI, OHIO, ASSIGNOR TO THE CINCINNATI SHAPER COMPANY, OF CINCINNATI, OHIO, A CORPORATION OF OHIO.

GEAR CASING FOR SHAPERS.

Application filed July 21, 1922. Serial No. 576,439.

*To all whom it may concern:*

Be it known that I, ROBERT T. HAZELTON, a citizen of the United States, and residing at Cincinnati, in the county of Hamilton and State of Ohio, have invented a new and useful Improvement in Gear Casings for Shapers, of which the following specification is a full disclosure.

This invention relates to improvements in machine tools and is particularly adaptable to machines of the shaper type employing a hollow main frame with the transmission gearing housed and journaled within the frame.

An object of the invention is to subdivide the interior of the main hollow frame of the machine into various compartments by partition walls integral with the walls of the frame, and in a capacity to provide an oil tight compartment at one end of the main frame for the speed change gearing, so that they may be run in oil, and the arrangement permitting a countershaft connecting with the speed change gearing to extend parallel with the shaft or shafts of the speed change gearing and from a compartment with second and likewise transmission controlling rods, so that all of the gearing is compactly housed within the main frame.

Another object of the invention is to mount and support the controlling levers for the change speed gearing so as to be carried by closure caps, sealing openings leading into respective compartments of the hollow frame of the machine, adapting the various controlling levers to be localized, for convenience and accessibility to the operator, having the handle ends extending in a corresponding direction.

Other features and advantages of the invention are more fully disclosed in the following description of the accompanying drawings, forming a part of this application, in which:

Figure 4 is a section on line 4, 4, Fig. 9.

Figure 5 is a section on line 5, 5, Fig. 9.

Figure 6 is a section on line 6, 6, Fig. 2.

Figure 7 is a section on line 7, 7, Fig. 6.

Figure 8 is a horizontal diagrammatic section through the gearing.

Figure 1:
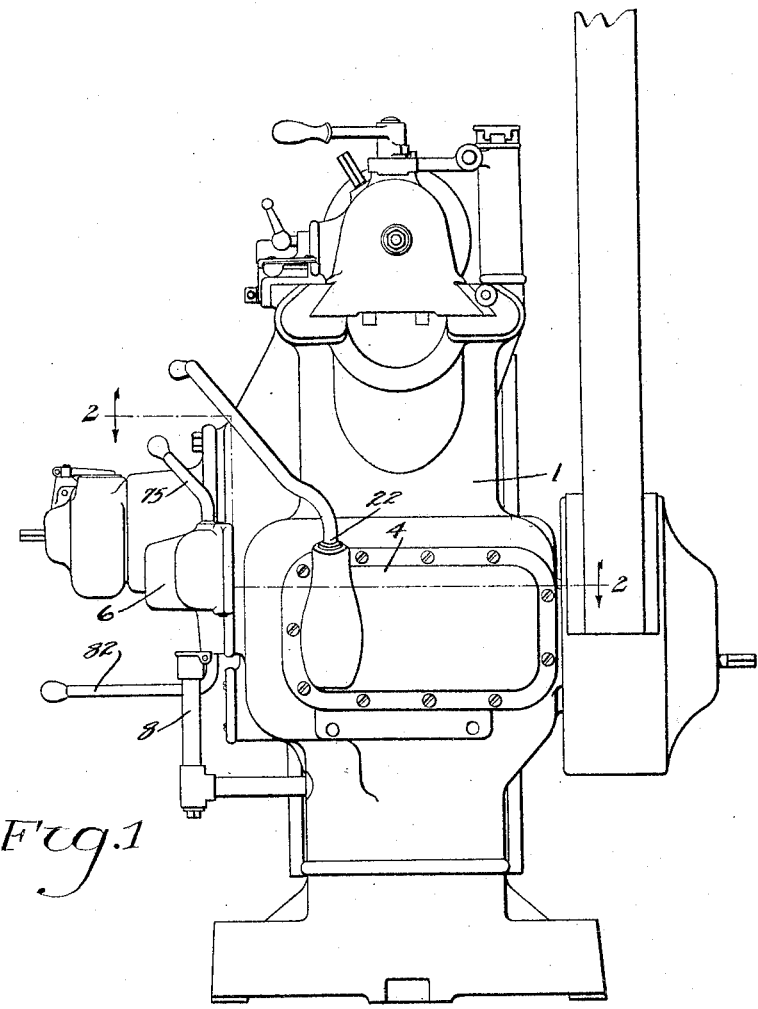
Figure 1 is a rear end elevation of a shaper to which the improved gearing is applied.
Figure 2:
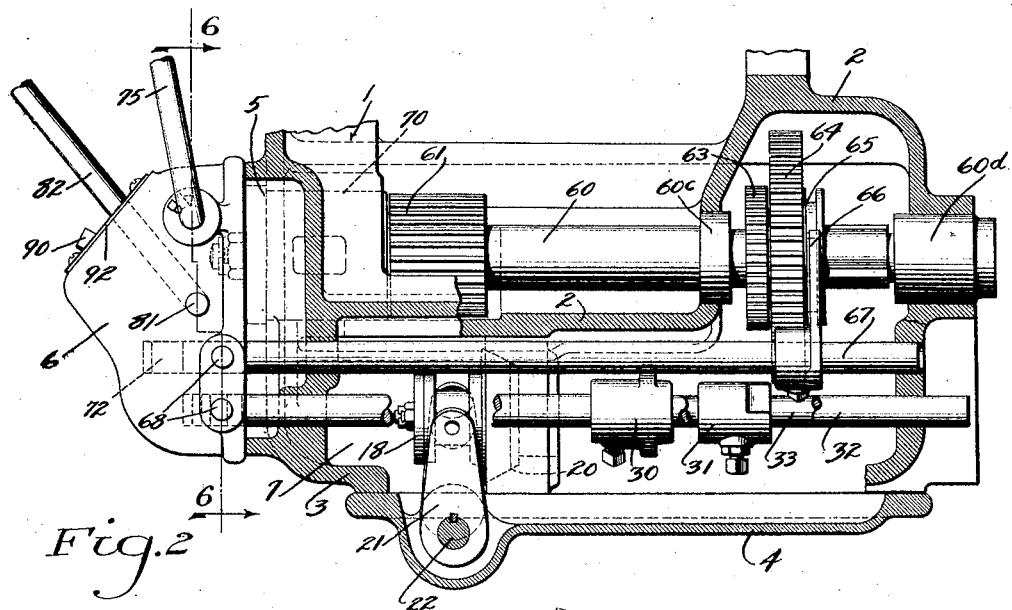
Figure 2 is a horizontal section taken on line 2, 2, Fig. 1.

The main frame 1 of the machine is of hollow structure and interiorly provided with partition walls as connecting walls 2, 3, integral with the walls of the main frame to subdivide the interior of the structure into several compartments and sub-compartments, and particularly providing compartments on one of the frames for housing the speed change gearing, adapted for running the gearing in a bath of lubricant. This adapts the shafts for the gearing and controlling rods to be journaled in the frame side walls crosswise of the frame with a counter-shaft as an intermediate connecting the speed change gearing in one compartment with the gearing to be driven thereby in a second compartment, extending through a partition wall dividing the compartments. The rear or end wall of the main frame at the compartment containing the speed change gearing has an opening through which access is had to the gearing and this opening is sealed by a closure plate or cover 4. This cover plate provides a support for carrying a controlling lever for the speed change gearing. The front wall of the main frame at the gear compartment is recessed as at 5, providing a compartment for housing additional lever mechanism or devices for controlling the speed change gearing and this compartment is also sealed by a closure cap or cover 6 providing a removable support for carrying the lever mechanism cooperating with the controlling rods of the speed change gearing.

This localizes the various controlling levers for convenience and accessibility to the operator which is further enlarged upon by extending all of the hand levers in a corresponding direction.

The base cross wall 3 of the gear compartment is shaped to provide a well or basin 7, the lubricant being supplied to the basin by a tube 8 external of the casing and tapping into the basin.

The gearing is driven by a pulley 9 loosely journaled upon a projected end of bearing bushing 10, fixed within a bearing in the rear side wall of the casing, reference being particularly had to Fig. 8. The pulley is connected to a shaft 11 by a friction clutch ring 12, keyed upon the shaft 11. The clutch may be of any type of construction, a split ring type being disclosed, which is controlled by lever arm 13 actuated by a cone collar 14, fixed to the end of a rod.

The cone collar 14 is splined to the shaft 11 and is fastened to one end of slide rod 16, which extends slidably through a central bore of the shaft 11 to the opposite end thereof, projects therebeyond, and has rigidly attached thereto a cone brake member 18, the cone member being splined to the shaft 11 as at 19. When the cone collar is shifted to the right of its position shown in Figure 8, the cone brake member 18 engages the walls of the conical opening 20 of the frame to prevent further rotation of the shaft 11. The cone brake member 18 is provided with a grooved hub, the groove of which is engageable by the ends of a forked arm 21 attached and oscillatable with a shaft 22, said shaft being suitably mounted in the casing cover and having a handle extending upwardly and forwardly along the side of the machine in a direction corresponding to certain gear shifting levers or handles, hereinafter described.

Upon the shaft 11 are mounted two shiftable gear assemblies, each comprising two gears connected by a sleeve, which sleeve is splined to the shaft 11. One assembly comprises the gears 25, 26, and the other the gears 27, 28, the gears being of gradually decreased diameter. A groove is formed between each pair of gears, with which cooperate the shifter lever arms, respectively 30, 31, of the corresponding shifter rods 32, 33, mounted in parallel relation with one another and in the same vertical plane. The shifter rods are suitably slidably mounted in the opposite walls of the casing and project through and beyond the front wall thereof. The cover 6 is attached to the casing over the pocket 5, surrounds the ends of the rods and has mounted upon it shifter handles and shifter rod locking means.

Mounted within the frame, below and at one side of the shaft 11, is a second or intermediate shaft 50, upon which are keyed two sets of gears corresponding to the sets of gears upon the shaft 11, said gears respectively designated 51, 52, 53, and 54.

A third or counter shaft 60 is mounted parallel with the first-mentioned shafts and on the outside of the partition 2, said shaft being mounted in suitable bearings at the end of the frame. The outer end of the shaft 60 is journaled in a flanged bushing 70, suitable fastening devices being passed through the flange and engaged with the frame to hold the bushing. The bushing is provided with an internal circumferential oil chamber 71 into which projects a cylindrical extension of the gear 61, the extension being provided with peripheral grooves lying within the chamber 71. The outer end of the shaft 60 is provided with a screw threaded stud 60$^a$ about which is disposed a washer 60$^b$ resting within a groove of the bushing 70 and against the vertical face thereof, a pin being provided for fastening the washer to the shaft 60. A nut engaged with the stud forces the washer against the face of the circular depression of the bushing. The shaft 60 is provided with a central bearing 60$^c$ having a chamber therein extending around the shaft, the shaft opposite the chamber being grooved, and an opening being provided laterally of said chamber in communication with the interior of the gear box. The opposite end bearing 60$^d$ of the shaft 60 is similarly provided with an oil space about the shaft and means is provided for the splash lubrication of the bearing.

A pinion 61 is keyed to the shaft 60, which pinion is in constant mesh with the bull gear 62. A pair of shiftable gears are splined to the shaft intermediate of its length, the gears being keyed together, and respectively designated 63, 64. A groove 65 is provided in the gear 64, engageable by the arm 66 of the shifting rod 67 which is mounted parallel with the first-mentioned shifter rods and projects beyond the frame in like manner. Locking means 68, for each of the rods 32, 33 and 67, is provided, which means is mounted in the wall of the cover 6 and each comprises a spring-pressed ball engageable with suitable notches in the rods. When the rod 67 is shifted to bring its notch 69 in engagement with the locking means 68, the gear 63 is disconnected from the gear 54 and the gear 64 is engaged with the gear 56, integral with the shaft 50 to increase the speed of the intermediate shaft 50, high and low speeds being thus provided for. Located beneath the V-notch 69 of the rod 67 is a rectangular notch 72 which is engaged by the arm 73 attached to the vertical portion 74 of the shifting handle 75, which handle extends forwardly of the machine. The vertical portion 74 is suitably stepped in the housing 6 and the arm 73 is adjustably clamped thereon. The rods 32, 33, are shiftable by a single arm 80 attached to the vertical portion 81 of the shifting handle 82. The portion 81 is slidably mounted in bearings of the housing 6. A spring 83, stepped in a socket, normally holds the end of the arm 80 in engagement with a notch 84 at the end of the rod 32 and below the locking notches 32ª therein. A corresponding notch 84ª is provided in the upper side of the shifter rod 33 and is designed to be engaged by the outer end of the arm 80 when the rods 32, 33, have their central locking notches engaged with the locking devices, that is, when the rods are in their neutral position. The arm 80 has an extension 90, the outer end of which extends through the H slot 91 of a plate 92 attached to the housing 6. The middle vertical portion of the slot permits of the depression or raising of the outer end of the arm 90 from one horizontal slot to the other to allow for the engagement of the outer end of the arm 80 with either rectangular notch 84 or 84ª when the rods 32 and 33 are in neutral position. The end of the arm 80 may be disengaged from the upper notch by the simple depression of the lever arm 82 to bring the said outer end into engagement with the notch 84ª, at which time the outer end of the arm 90 will be disposed for travel in either direction in the lower horizontal portion of the H slot.

Figure 3:
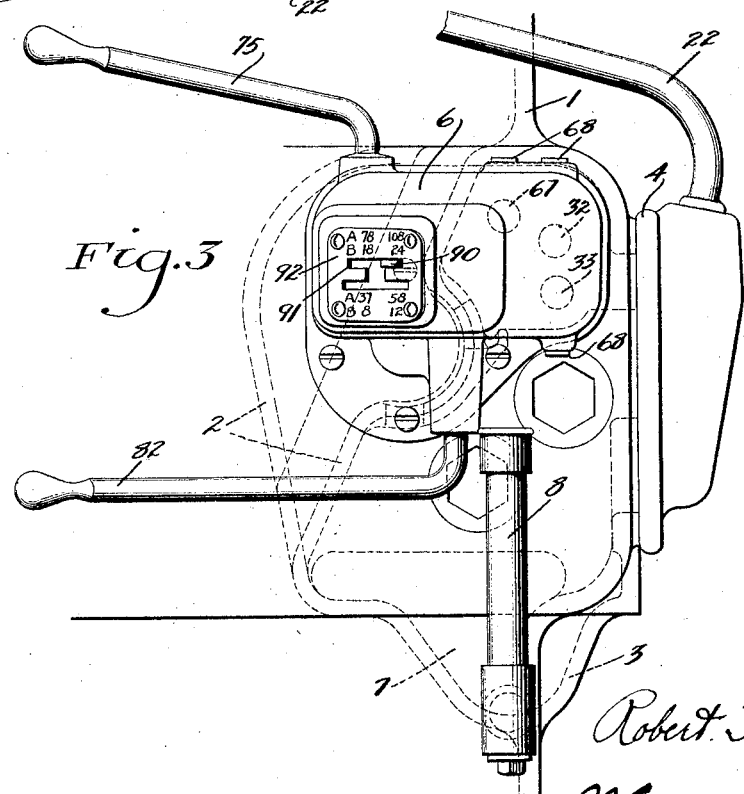
Figure 3 is an enlarged face view of the casing carrying the shifting lever, the casing being fixed to the side of the shaper frame.
Figure 9:
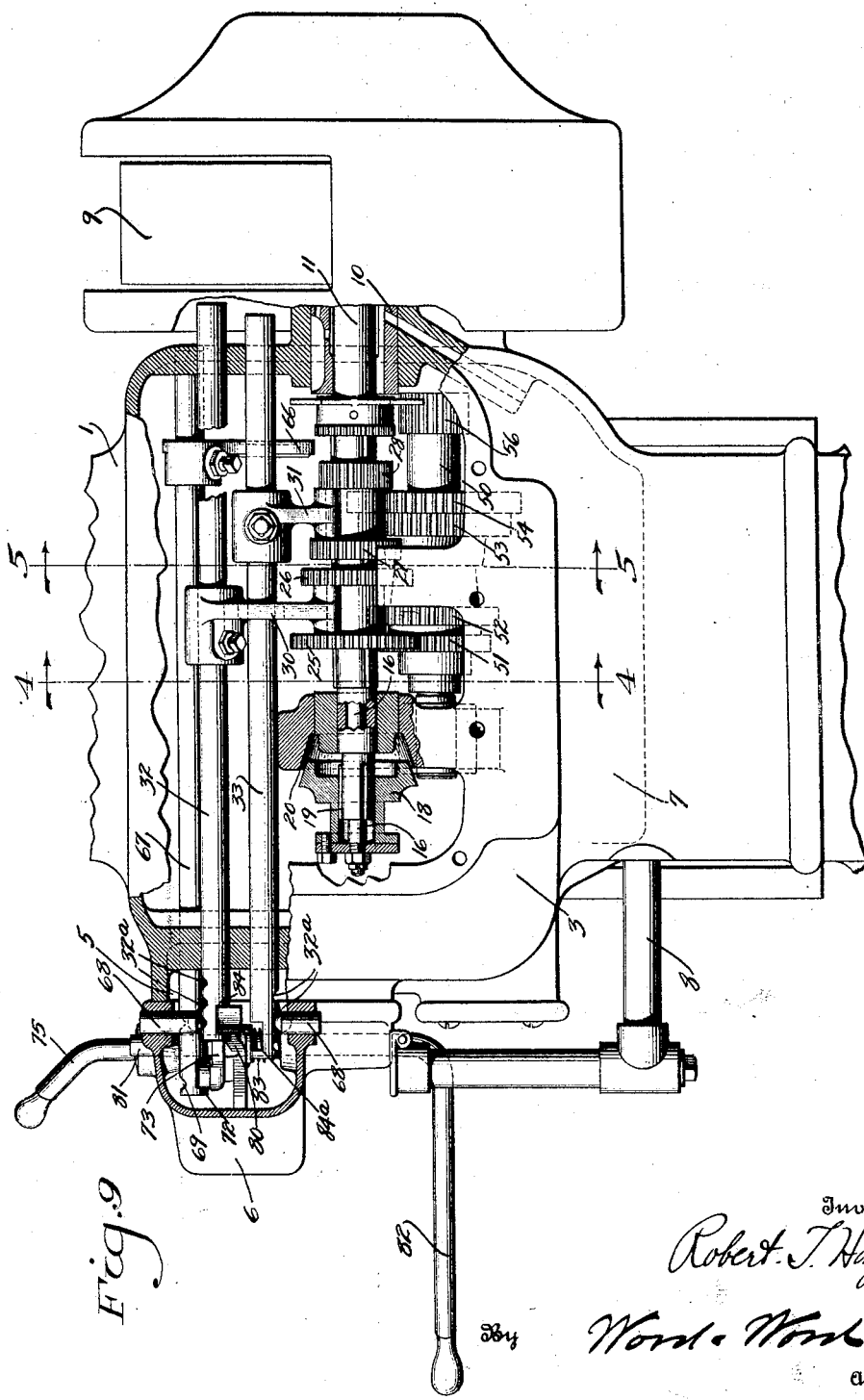
Figure 9 is an enlarged end elevation of the gearing casing as a part of the shaper frame with the parts thereof shown in section to show the shifting or controlling mechanism for the gearing.
Figure 10:
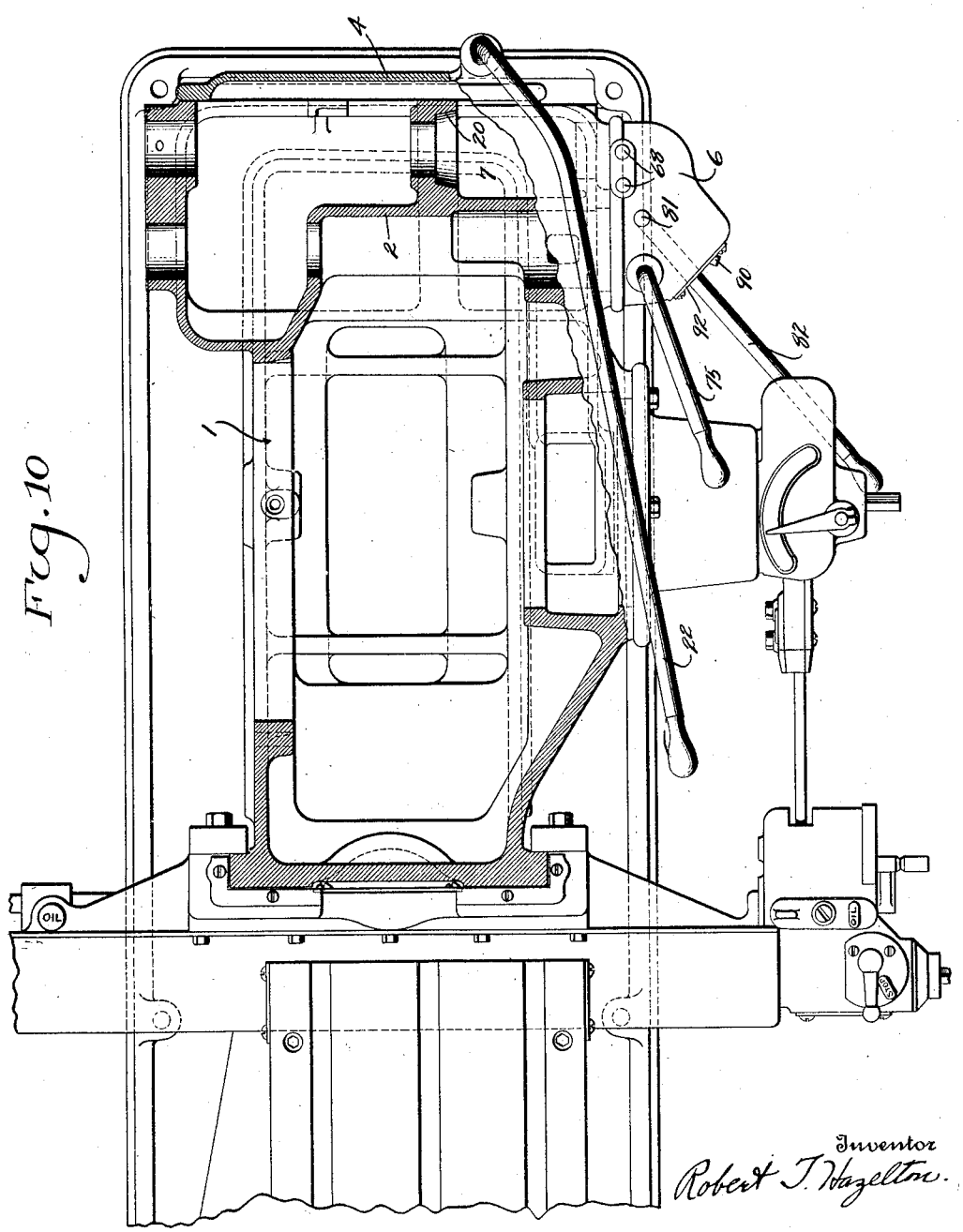
Figure 10 is a general plan section showing the combined features of my invention relative to a shaper.

By inspection of Figures 3 and 9, it will be evident that in order to bring the outer end of the arm 80 into engagement from one notch to another, the rods must be in their neutral position. When the extension 90, of the arm 80, is engaged at an extremity of either the upper or lower horizontal portions of the H slot, (see Fig. 3) no raising or lowering of the arm 80 can be made.

The partition wall 2 is angled to provide an offset portion of the speed changing compartment which enables the counter-shaft 60 to be extended parallel with the shafts 11 and 50 of the speed change gearing and through the partition wall from one compartment into a second; the offset portion of the casing also allowing for the slide gears 63, 64 upon the counter-shaft. The shafts and controlling rods are therefore all parallel with one another and mounted in bearings in the side walls of the housing, providing very substantial support for the shafts with all of the gearing compactly housed within the main frame with certain elements thereof in different compartments from one another, permitting some for the most beneficial results to be run in an oil bath while those in which such requirement is not essential or required are protected against the same, especially from being conveyed or cast from one to the other.

Having described my invention, I claim:

1. In a machine tool of the character disclosed, a hollow frame structure interiorly having cross walls integral with the main walls of the frame structure subdividing the interior of the frame into a plurality of compartments, one compartment thereof at one end of the frame structure providing a liquid lubricant holder and enclosure for transmission gearing, and sub-compartments related to said compartment for independently housing respective portions of said transmission gear and guarding the same from the lubricant in said first named compartment, and a removable closure for one of said sub-compartments supporting actuating mechanism for transmission control connecting with controlling elements of said transmission gearing engaging into the sub-compartment.

2. In a machine tool of the character disclosed, a hollow frame structure interiorly having cross walls integral with the main walls of the frame structure subdividing the interior of the frame into a plurality of compartments, one compartment thereof at one end of the frame structure providing a liquid lubricant holder and enclosure for transmission gearing, and having a partition wall thereof arranged to extend a counter-shaft therethrough crosswise of the main frame from said compartment to a second, for transmittingly connecting the gearing in the compartment with the gearing in a second, a sub-compartment related to said gearing enclosing compartment, and a removable closure for said sub-compartment supporting actuating mechanism for transmission control connecting with controlling elements of said transmission gearing engaged into said sub-compartment.

3. In a machine tool of the character disclosed, a hollow frame structure interiorly having cross walls integral with the main wall of the frame structure subdividing the interior of the frame into a plurality of compartments, one compartment thereof at one end of the frame structure providing a liquid lubricant holder and enclosure for transmission gearing, sub-compartments related to said compartment for independently housing respective portions of said transmission gear and guarding the same from the lubricant in said first named compartment, and a partition wall of said first named compartment provided for extending a counter-shaft therethrough crosswise of the main frame for connecting the gearing in one compartment with an adjacent second compartment, and a removable closure for one sub-compartment supporting actuating mechanism for transmission control connecting with controlling elements of said transmission gearing engaged into the sub-compartment.

In witness whereof I hereunto subscribe my name, as attested by the two subscribing witnesses.

ROBERT T. HAZELTON.

Witnesses:
R. KISTNER,
L. A. BECK.